(12) United States Patent
Wang et al.

(10) Patent No.: US 11,238,123 B1
(45) Date of Patent: Feb. 1, 2022

(54) INFLUENCER SCORING MODEL

(71) Applicant: Amplified Media Logic LLC, Ann Arbor, MI (US)

(72) Inventors: Lin Jen Wang, Redwood City, CA (US); Jamie Lynn Frech, Ann Arbor, MI (US)

(73) Assignee: Amplified Media Logic LLC, Ann Arbor, MI (US)

( * ) Notice: Subject to any disclaimer, the term of this patent is extended or adjusted under 35 U.S.C. 154(b) by 0 days.

(21) Appl. No.: 16/953,918

(22) Filed: Nov. 20, 2020

(51) Int. Cl.
 *G06F 16/9538* (2019.01)
 *G06F 16/9536* (2019.01)
 *G06Q 10/06* (2012.01)

(52) U.S. Cl.
 CPC ...... *G06F 16/9536* (2019.01); *G06F 16/9538* (2019.01); *G06Q 10/0639* (2013.01)

(58) Field of Classification Search
 CPC ............ G06F 16/9536; G06F 16/9538; G06Q 10/0639
 See application file for complete search history.

(56) References Cited

U.S. PATENT DOCUMENTS

| | | | | |
|---|---|---|---|---|
| 8,316,020 B1* | 11/2012 | Kleinmann | ........... | G06F 16/437 707/734 |
| 9,760,608 B2* | 9/2017 | Cavanagh | ............. | G06F 16/951 |
| 2003/0216942 A1* | 11/2003 | Hawks | ................... | G06Q 30/02 705/2 |
| 2004/0073476 A1* | 4/2004 | Donahue | ............ | G06Q 30/0203 705/7.32 |
| 2004/0167814 A1* | 8/2004 | Hawks | ................. | G06Q 20/201 705/20 |
| 2006/0229932 A1* | 10/2006 | Zollo | ................. | G06Q 30/0631 705/26.7 |
| 2007/0067210 A1* | 3/2007 | Rishell | ............... | G06Q 30/0204 705/7.32 |
| 2007/0168533 A1* | 7/2007 | Canright | ................. | H04L 41/12 709/230 |
| 2008/0189169 A1* | 8/2008 | Turpin | ............... | G06Q 30/0264 705/7.33 |

(Continued)

*Primary Examiner* — Mark D Featherstone
*Assistant Examiner* — Navneet Gmahl
(74) *Attorney, Agent, or Firm* — Honigman LLP; Brett A. Krueger

(57) ABSTRACT

A method for operating an influencer scoring model includes receiving, for a plurality of professionals, professional information and publication information. For each professional, the method also includes generating a professional profile that includes a plurality of attributes. The plurality of attributes are based on (i) professional information and (ii) publication information. The method also includes determining one or more attribute connections among the plurality of attributes of the professional profile. Each attribute connection is based on a common attribute shared between the respective professional and another professional. The method also includes generating a score that includes an authority component and an influence component. A scoring model is configured to receive the plurality of attributes and the attribute connections for the respective professional. The authority component represents at least one attribute corresponding to the received professional information. The influence component represents one or more attribute connections of the professional profile.

24 Claims, 7 Drawing Sheets

(56) References Cited

U.S. PATENT DOCUMENTS

| | | | |
|---|---|---|---|
| 2010/0241713 A1* | 9/2010 | Shimizu | G06Q 10/00 709/206 |
| 2011/0313940 A1* | 12/2011 | Kerr | G06Q 10/10 705/321 |
| 2012/0123956 A1* | 5/2012 | Chenthamarakshan | G06Q 10/10 705/321 |
| 2013/0031015 A1* | 1/2013 | Schneider | G06Q 10/063112 705/321 |
| 2014/0278485 A1* | 9/2014 | Grant | G06Q 30/0201 705/2 |
| 2014/0278821 A1* | 9/2014 | McConnell | H04L 67/306 705/7.38 |
| 2015/0120414 A1* | 4/2015 | van Stolk | G06Q 30/0631 705/14.16 |
| 2016/0246790 A1* | 8/2016 | Cowdrey | G06F 16/24578 |
| 2017/0249315 A1* | 8/2017 | Mawji | G06F 16/24578 |
| 2017/0249698 A1* | 8/2017 | Chan | G06Q 40/025 |
| 2019/0199594 A1* | 6/2019 | Chiocchi | H04L 41/12 |
| 2020/0402015 A1* | 12/2020 | Ozcaglar | G06N 20/00 |
| 2021/0089603 A1* | 3/2021 | Abbasi Moghaddam | G06F 16/9536 |

\* cited by examiner

INFLUENCER SCORING MODEL

TECHNICAL FIELD

This disclosure relates to an influencer scoring model.

BACKGROUND

Conventional marketing techniques for pharmaceutical and medical companies often involve leveraging practitioners in the industry or a direct to consumer approach. Recently the cost has increased substantially for targeting practitioners in the industry with highly regarded opinions or large amounts of influence. These practitioners with highly regarded opinions or large amounts of influence are called key opinion leaders "KOL." Medical companies often develop relationships with KOLs in the industry to help market the company's product. Identifying the KOLs for a particular pharmaceutical or medical industry can be a difficult process. Current methods of KOL targeting are ineffective because the most impactful KOLs do not always recommend the medical company's product. Identifying KOLs in the industry that provide the most impact for a pharmaceutical or medical company allows the companies to have a potentially more effective targeted marketing approach.

SUMMARY

One aspect of the disclosure provides a method for operating an influencer scoring model. The method includes receiving, at data processing hardware, for a plurality of professionals, professional information and publication information. For each professional of the plurality of professionals, the method includes generating, by the data processing hardware, a professional profile that includes a plurality of attributes related to the respective professional. The plurality of attributes are based on (i) the received professional information and (ii) the received publication information. The method also includes determining, by the data processing hardware, one or more attribute connections among the plurality of attributes of the professional profile. Each attribute connection based on a common attribute shared between the respective professional and another professional of the plurality of professionals. The method also includes generating, by the data processing hardware, using a scoring model, a score that includes an authority component and an influence component. The scoring model is configured to receive, as inputs, the plurality of attributes related to the respective professional and the one or more attribute connections for the respective professional. The authority component represents a first portion of the score determined based on at least one attribute of the plurality of attributes corresponding to the received professional information of the respective professional. The influence component represents a second portion of the score determined based on the one or more attribute connections among the plurality of attributes of the professional profile of the respective professional.

Implementations of the disclosure may include one or more of the following optional features. In some implementations, the method further includes, receiving, at data processing hardware, a user input indicating a filter term. In these implementations, for each professional profile, the method further includes, generating, by the data processing hardware, a relevancy score based on the filter term received from user input and weighing, by the data processing hardware, the score from the scoring model by the relevancy score to form an overall score based on the filter term received as a user input. In some examples, the professional information includes at least one of a current employer, a past employer, a field of study, or an education degree.

The publication information may correspond to at least one publication and includes at least one of an author, a coauthor, an abstract, a title, or a mesh term associated with the at least one publication. In some implementations, the authority component of the score generates by, for each of the at least one attribute of the plurality of attributes that corresponds to the received professional information of the respect professional identifying a rank associated with the respective attribute and weighing the respective attribute by the identified rank associated with the respective attribute.

In some examples, the influence component of the score generates, for each of the one or more attribute connections for the respective professional by: identifying a duration of the of the respective attribute connection for the respective professional; and generating an influence weight for the respective attribute connection of the respective professional based on the identified duration of the respective attribute connection, the influence weight indicates a correlation between the duration of the respective attribute connection and the respective attribute connection. The influence component of the scores generates by aggregating each influence weight associated with the one or more attribute connections. In some implementations, the method further includes, identifying a time period associated with the respective attribute connection for the respective professional and determining a time difference between the time period associated with the respective attribute connection for the respective professional and a current time. In these implementations, the method also includes, discounting the influence weight for the respective attribute connection for the respective professional based on the time difference between the time period associated with the respective attribute connection for the respective professional and a current time.

In some examples, the influence component of the score generates, for each of the one or more attribute connections for the respective professional by: identifying a time period associated with the respective attribute connection for the respective professional; and generating an influence weight for the respective attribute connection or the respective professional based on a difference between a current time and the time period associated with the respective attribute connection for the respective professional, the influence weight indicates a correlation between when the respective attribute connection occurred and the current time when generating the score includes the influence component. The influence component generates by aggregating each influence weight associated with the one or more attribute connections. Optionally, the score may include a sum of the authority component and the influence component.

In some examples, generating the professional profile that includes the plurality of attributes related to the respective professional includes deriving a respective attribute from at least one of the professional information or the publication information. In these examples, determining whether the respective attribute corresponds to a preexisting attribute of a corresponding professional profile of one of the plurality of professionals based on the at least one of the professional information or the publication information that corresponds to the derived respective attribute and when the respective attribute corresponds to the preexisting attribute of the corresponding professional profile of one of the plurality of professionals, updating the corresponding professional profile to additionally include the respective attribute. Optionally, the respective attribute may include an alias of the respective professional of the corresponding professional profile. Wherein determining whether the respective attribute corresponds to the preexisting attribute of the corresponding professional profile includes determining that the professional information associated with the alias matches the preexisting attribute of the corresponding professional profile for the respective professional.

In some examples, determining that the professional information associated with the alias matches the preexisting attribute of the corresponding professional profile for the respective professional includes identifying at least one alias of the respective professional and determining, using an alias matching model, whether the corresponding professional information associated with the at least one alias matches one of the plurality of attributes of the corresponding professional profile for the respective professional. The alias matching model is configured to receive, as input, the corresponding professional information for at least one alias of the respective professional and the plurality of professional attributes of the corresponding professional profile for the respective profile and to generate, as output, a matching score. The matching score indicates a likelihood that the at least one alias is an alias of the respective professional and determining that the matching score satisfies a matching score threshold indicating a level of confidence that the at least one alias is an alias of the respective professional.

Another aspect of the disclosure provides a system for operating an influencer scoring model. The system includes data processing hardware and memory hardware in communication with the data processing hardware. The memory hardware storing instructions that when executed on the data processing hardware cause the data processing hardware to perform operations. The operations include receiving for a plurality of professionals, professional information and publication information. For each professional of the plurality of professionals, the operations include generating a professional profile that includes a plurality of attributes related to the respective professional. The plurality of attributes are based on (i) the received professional information and (ii) the received publication information. The operations also include determining one or more attribute connections among the plurality of attributes of the professional profile. Each attribute connection based on a common attribute shared between the respective professional and another professional of the plurality of professionals. The operations also include generating, using a scoring model, a score that includes an authority component and an influence component. The scoring model is configured to receive, as inputs, the plurality of attributes related to the respective professional and the one or more attribute connections for the respective professional. The authority component represents a first portion of the score determined based on at least one attribute of the plurality of attributes corresponding to the received professional information of the respective professional. The influence component represents a second portion of the score determined based on the one or more attribute connections among the plurality of attributes of the professional profile of the respective professional.

Implementations of the disclosure may include one or more of the following optional features. In some implementations, the operations further include, receiving a user input indicating a filter term. In these implementations, for each professional profile, the operations further include, generating a relevancy score based on the filter term received from user input and weighing the score from the scoring model by the relevancy score to form an overall score based on the filter term received as a user input. In some examples, the professional information includes at least one of a current employer, a past employer, a field of study, or an education degree.

The publication information may correspond to at least one publication and includes at least one of an author, a coauthor, an abstract, a title, or a mesh term associated with the at least one publication. In some implementations, the authority component of the score generates by, for each of the at least one attribute of the plurality of attributes that corresponds to the received professional information of the respect professional identifying a rank associated with the respective attribute and weighing the respective attribute by the identified rank associated with the respective attribute.

In some examples, the influence component of the score generates, for each of the one or more attribute connections for the respective professional by: identifying a duration of the of the respective attribute connection for the respective professional; and generating an influence weight for the respective attribute connection of the respective professional based on the identified duration of the respective attribute connection, the influence weight indicates a correlation between the duration of the respective attribute connection and the respective attribute connection. The influence component of the scores generates by aggregating each influence weight associated with the one or more attribute connections. In some implementations, the operations further includes, identifying a time period associated with the respective attribute connection for the respective professional and determining a time difference between the time period associated with the respective attribute connection for the respective professional and a current time. In these implementations, the operations also include, discounting the influence weight for the respective attribute connection for the respective professional based on the time difference between the time period associated with the respective attribute connection for the respective professional and a current time.

In some examples, the influence component of the score generates, for each of the one or more attribute connections for the respective professional by: identifying a time period associated with the respective attribute connection for the respective professional; and generating an influence weight for the respective attribute connection or the respective professional based on a difference between a current time and the time period associated with the respective attribute connection for the respective professional, the influence weight indicates a correlation between when the respective attribute connection occurred and the current time when generating the score includes the influence component. The influence component generates by aggregating each influence weight associated with the one or more attribute connections. Optionally, the score may include a sum of the authority component and the influence component.

In some examples, generating the professional profile that includes the plurality of attributes related to the respective professional includes deriving a respective attribute from at least one of the professional information or the publication information. In these examples, determining whether the respective attribute corresponds to a preexisting attribute of a corresponding professional profile of one of the plurality of professionals based on the at least one of the professional information or the publication information that corresponds to the derived respective attribute and when the respective attribute corresponds to the preexisting attribute of the corresponding professional profile of one of the plurality of professionals, updating the corresponding professional profile to additionally include the respective attribute. Optionally, the respective attribute may include an alias of the respective professional of the corresponding professional profile. Wherein determining whether the respective attribute corresponds to the preexisting attribute of the corresponding professional profile includes determining that the professional information associated with the alias matches the preexisting attribute of the corresponding professional profile for the respective professional.

In some examples, determining that the professional information associated with the alias matches the preexisting attribute of the corresponding professional profile for the respective professional includes identifying at least one alias of the respective professional and determining, using an alias matching model, whether the corresponding professional information associated with the at least one alias matches one of the plurality of attributes of the corresponding professional profile for the respective professional. The alias matching model is configured to receive, as input, the corresponding professional information for at least one alias of the respective professional and the plurality of professional attributes of the corresponding professional profile for the respective profile and to generate, as output, a matching score. The matching score indicates a likelihood that the at least one alias is an alias of the respective professional and determining that the matching score satisfies a matching score threshold indicating a level of confidence that the at least one alias is an alias of the respective professional.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Medical and pharmaceutical companies target key opinion leaders (KOL) to help market products for the companies. The KOLs are practitioners and professionals within a specific industry that have highly regarded opinions and/or a large amount influence over the other professionals within the industry. The KOLs may be able to provide marketing campaigns that include face to face visits, drug samples, speeches, disease education, and conferences. Yet identifying the most impactful KOLs for a particular industry or for a particular therapy is difficult for companies. Often times, it involves having to manually sift through KOLs or working from static lists of known KOLs. Moreover, the impact of a KOL can evolve over time. The influence or the authority of a KOL may increase/decrease if a KOL changes jobs or changes his or her activity in the field. For instance, an individual has prestigious credentials and works in a prestigious position, but actually has become less involved in his or her field (e.g., less collaboration with other professionals) or employs techniques that have become outdated or refuted. The fact that many aspects that affect a KOL's impact are actually dynamic makes it difficult to understand, let alone quantify, a KOL's true influence and/or authority.

Implementations herein are directed toward an influencer scoring model that scores the potential impact (e.g., influence and/or authority) of KOLs The influencer scoring model is configured to dynamically quantify a KOL's impact by generating an influence score for professionals in particular fields of an industry (e.g., the medical industry). The influencer scoring model generally includes a compiler, a scorer, and a dashboard interface. The compiler collects information from data sources (e.g., one or more online databases) to develop a professional profile for each professional associated with a particular industry. The professional profile for the professional is based on professional information and publication information. The scorer receives the professional profile for each professional from the compiler and generates a score for each respective professional. The score for the professional includes an authority component and an influence component. The authority component relates to the credibility that professional has within his or her industry and the influence component relates to the influence that the professional has over the industry.

The scorer sends the score to the dashboard interface where the user can select the professional that meets the user's specific needs. The user, via the dashboard interface, may enter filtering criteria that the user desires the professional to have. The user may additionally indicate how important the influence component or authority component of the score is for the user. The dashboard interface displays the professionals that meet the users filtering criteria via a user device.

Figure 1:
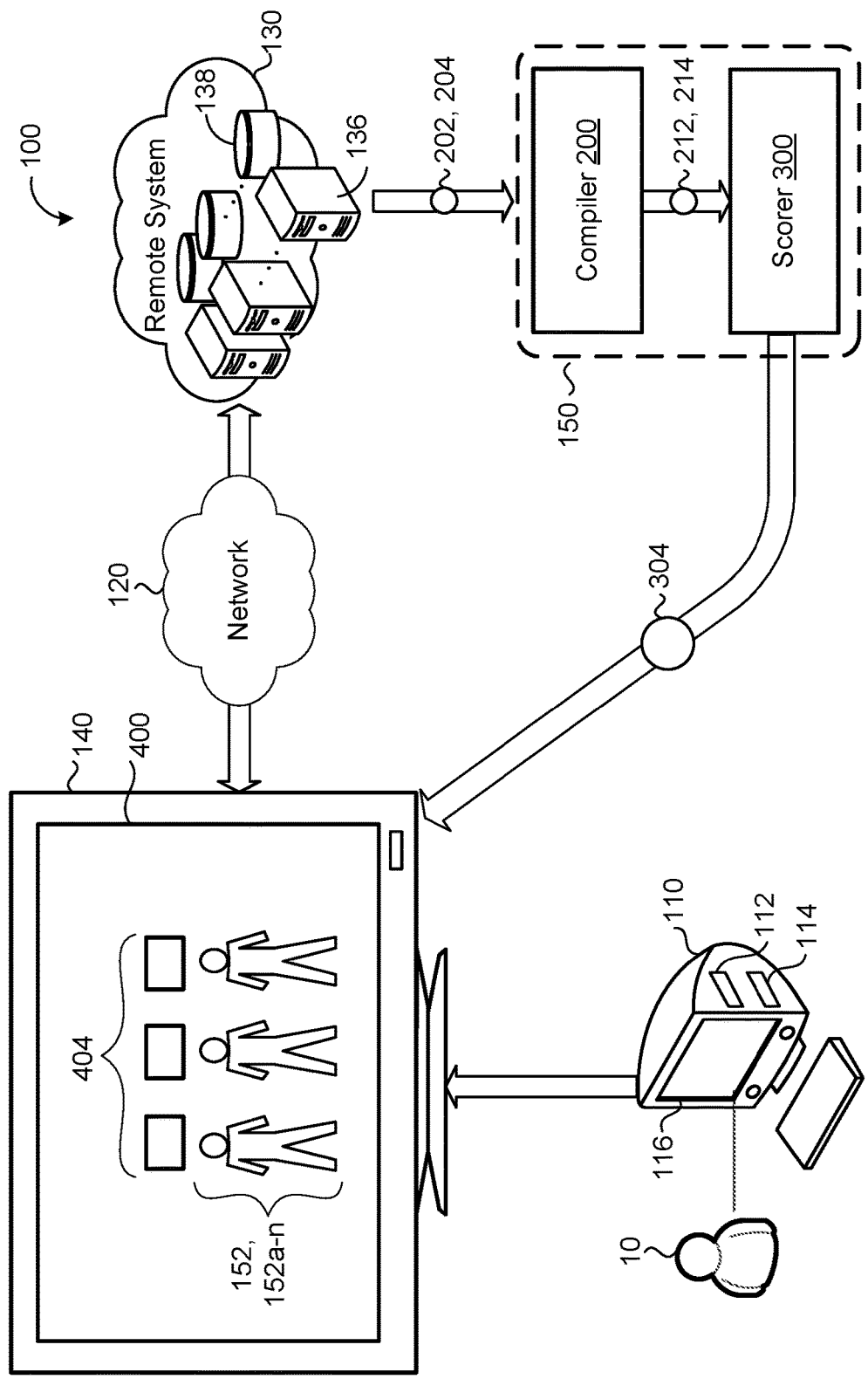
FIG. 1 is a schematic view of an example system with an influencer scoring model.

Referring to FIG. 1, in some implementations, an example system 100 includes one or more user devices 110 each associated with a respective user 10 and in communication with a remote system 130 via a network 120. Each user device 110 may correspond to a computing device, such as, without limitation, a desktop workstation, a laptop workstation, or a mobile computing device (e.g., smart phone, tablet, or wearable device), and includes data processing hardware 112 and memory hardware 114. The remote system 130 may be a single computer, multiple computers, or a distributed system (e.g., a cloud environment) having scalable/elastic resources, such as processing resources 136 (e.g., data processing hardware) and/or storage resources 138 (e.g., memory hardware). The user device 110 may include a computing environment 140. For instance, the computing environment 140 hosts an application that implements the influencer scoring model. In some implementations, the user device 110 includes a screen 116 with a graphical user interface (GUI) to display the computing environment 140. In some examples, the screen 116 of the user device 110 includes a touch screen 116 configured to receive touch inputs from the user 10 to select content displayed on the screen 116 and/or to execute some functionality associated with an area receiving the touch input.

The computing environment 140 of the user device 110 is in communication with the remote system 130 via the network 120. The computing environment 140 may also be in communication with a KOL system 150. The KOL system 150, as shown in FIG. 1 by the dotted box, collectively refers to the compiler 200 and the scorer 300. The KOL system 150 may be located remotely (e.g., part of the remote system 130), locally (e.g., part of user device 110), or some hybrid of both. When located locally, the KOL system 150 may be stored on the memory hardware 114 of the user device 110 and executed using data processing hardware 112 of the user device 110. When located remotely, the KOL system 150 may be stored in the remote storage resources 138 and executed using one or more processing resources 136. For instance, by being remotely located, the KOL system 150 may potentially utilize a larger volume of computing resources (e.g., when the remote system 130 is a distributed system).

The compiler 200 is configured to receive professional information 202 and publication information 204 for a plurality of professionals 152, 152a-n from various data sources (e.g., from data sources associated or in communication with the remote system 130). Professional information 202 refers to information that details a given professional's past or present status. Some examples of the professional information 202 include a current employer, a past employer, a field of study, an education degree, training (e.g., post-graduate training), past or present employer details (e.g., job role, department, appointments), professional affiliations (e.g., professional society or organization memberships), professional accolades (e.g., honors or awards), professional certifications, reviews (e.g., peer reviews, patient or client reviews), and other similar information. Publication information 204 generally refers to information that is published and disseminated (e.g., by a third-party) that relates to the industry of the professional and/or an area of study for the professional 152. For instance, for medical professionals, publication information 204 refers to journals articles or other writings. In some examples, the publication information 204 refers to information published through a peer review process. The publication information 204 includes any descriptive information from a publication. For a particular publication, this means that publication information 204 may include an author, a coauthor, an abstract, a title, or a mesh term associated with the content of the publication (e.g., keywords identifying the content of the publication). For each professional 152 of the plurality of professionals 152, the compiler 200 generates a professional profile 212 that includes a plurality of attributes 214, 214a-n related to the respective professional 152. The plurality of attributes 214 are based on (i) the received professional information 202 and (ii) the received publication information 204. For instance, each attribute 214 corresponds to word(s) or descriptor(s) derived from the information 202, 204. In other words, the attributes 214 may be a list of keywords that are descriptive of a particular professional 152. For example, each attribute 214 is a key-value pair where the key corresponds to a type of attribute and the value corresponds to a word or string that defines the type of attribute. To illustrate, the profile 212 includes an education-based attribute 214 based on the professional information 202 with the key-value pair of doctorate education as the key and Harvard University as the value (i.e., [doctorate education, Harvard University]) to define that the professional 152 attended Harvard University for his or her doctorate. Another example that is based on publication information 204 may be a publication-based attribute 214 where the key-value pair is [primary author, "Gene Editing with CRISPR"] to define that the professional 152 wrote an article about CRISPR where the professional 152 was the primary author.

The compiler 200 transmits the professional profile 212 that includes the plurality of attributes 214 for each professional 152 to the scorer 300.

The compiler 200 is also configured to determine one or more attribute connections 215a-n among the plurality of attributes 214 of the professional profile 212. Each attribute connection 215 is based on a common attribute 214 shared between the respective professional 152 and another professional 152 of the plurality of professionals 152. For example, two professionals 152 may have a common attribute 214 of a past employer (e.g., both professionals 152 worked for MD Anderson Cancer Center at some point in their careers). The common attribute 214 of the past employer between the two professionals 152 establishes the attribute connection 215.

The scorer 300 generates, using a scoring model 302, a score 304 that includes an authority component 314 and an influence component 324. The scoring model 302 is configured to receive, as inputs, the plurality of attributes 214 related to the respective professional 152 and the one or more attribute connections 215 for the respective professional 152. The authority component 314 represents a first portion of the score 304 determined based on at least one attribute 214 of the plurality of attributes 214 that correspond to the received professional information 202 of the respective professional 152. The influence component 324 represents a second portion of the score 304 determined based on the one or more attribute connections 215 among the plurality of attributes 214 of the professional profile 212 of the respective professional 152.

The scorer 300 may transmit the score 304 either directly to the computing environment 140 and/or transmit the score 304 to the remote system 130 via the network 120 that is accessible to the computing environment 140. In some examples, the computing environment 140 is configured to generate an overall score 404 based in part on the score 304 from the scorer 300, as discussed in more detail below. A dashboard interface 400 displays the overall score 404 for each professional 152.

Figure 2:
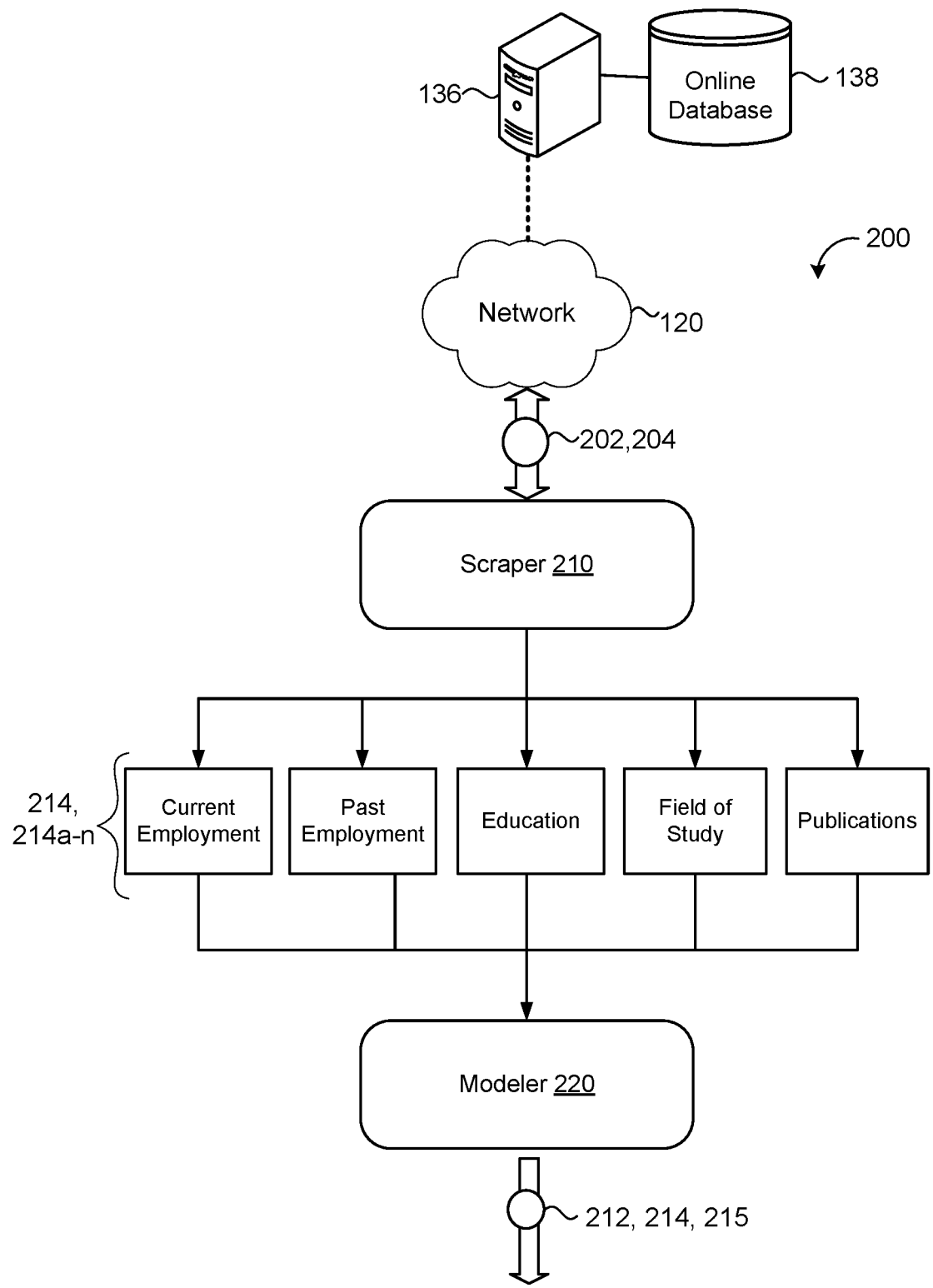
FIG. 2 is a schematic view of an exemplary compiler.

Referring now to FIG. 2, the compiler 200 may include a scraper 210 and a modeler 220. The scraper 210 is in communication with the remote system 130 to access one or more online databases 138 via the network 120. The scraper 210 accesses the storage resources 138 (e.g., online database 138) to collect professional information 202 and publication information 204. The online database 138 may include data sources such as webpages and publication databases to gather the professional information 202 and publication information 204. The scraper 210 combs the online database 138 to gather professional information 202 and publication information 204 for each professional 152 of the plurality of professionals 152. The scraper 210 places the professional information 202 and publication information 204 for each professional 152 into one of the attributes 214 of the plurality of attributes 214. The plurality of attributes 214 are based on the received professional information 202 and the received publication information 204.

FIG. 2 depicts an example where the plurality of attributes 214 include current employment, past employment, education, field of study, and publications. For instance, the attribute 214 for current and past employment may include information that relates to the title, the department, and/or the time period that the professional 152 worked for an employer. The education attribute 214 may include degrees, postdoctoral work, and/or awards. The attribute 214 for field of study may include general and specific information. For example, the field of study attribute 214 may include that the professional 152 practices in the field of neurology. More specifically, the field of study attribute 214 may include that the professional 152 worked in the neuro-oncology field within neurology. The publication attribute 214 may include authors, author order, abstract, title, and mesh terms for a particular publication.

In some examples, the publication attribute 214 includes additional authors for a publication that a respective professional 152 published. That is, where the professional 152 published a paper with four other professionals 152, the publication attribute 214 would list all five professionals 152 as authors to the paper. The publication attribute 214 may further include the order of the authors for the publication where each position in the order may indicate a particular role for a respective author. In particular, where an author is listed first or second on the publication the author may be the primary author. Where the author is in the middle of the author order, the author may only be a contributing author. The last author in the author order of the publication may only be a sponsor or grant holder of the publication. That is, the order the respective professional 152 is listed as the author in the publication may indicate the level of significance the professional 152 had for that publication. By incorporating or designating the ordered position or role of an author, the scorer 300 may utilize the role or position in the order as a factor to adjust the score 304 corresponding to a particular professional 152. For example, a publication attribute 214 that indicates that a professional 152 was a sponsor would have less weight on the score 304 than a publication attribute 214 that indicates that a professional 152 was a primary author.

In some implementations, the publication attribute 214 includes one or more mesh terms. Mesh terms are peer reviewed terms specific to the publication. The mesh terms are similar to ad word tags in some regards, but also uniquely robust in that peers during a peer review process for the publication generate the mesh terms; resulting in a curated list of relevant terms identified by other professionals. For example, when the professional 152 publishes a paper that is peer reviewed, the peer reviewers may assign the paper a mesh term of "Diabetes Mellitus." That is, the peer reviewers would conclude the paper published by professional 152 was significantly related to the topic for diabetes mellitus.

The modeler 220 generates the professional profile 212 based on the plurality of attributes 214 for the respective professional 152. The compiler 200 derives a respective attribute 214 from at least one of the professional information 202 or the publication information 204 and communicates the attribute 214 to the modeler 220. For example, if a professional 152 is a podiatrist, the professional profile 212 for that professional 152 will include an attribute 214 that identifies the profession 152 as a podiatrist (e.g., in a field of study attribute 214). The modeler 220 generates the professional profile 212 for each professional 152 based on the plurality of attributes 214. That is, the podiatrist professional 152 may also have a degree from Temple University. Here, the modeler 220 generates the professional profile 212 for the professional 152 that indicates the professional 152 has the attributes 214 of a podiatrist that attended Temple University. The modeler 220 may generate the professional profile 212 based on any number of attributes 214 from the plurality of attributes 214.

In some examples, the professional profile 212 is a template of candidate attributes 214 that may apply to a particular professional 152. For instance, there is an administrator of the KOL system 150 that curates a list of candidate attributes 214 based on the professional industry. The administrator may setup a first template profile 212 of attributes 214 that are specific to the medical professionals in the medical industry or a second template profile 212 of attributes 214 that are specific to legal professions in the legal industry. In other words, although several examples that describe the functionality of the KOL system 150 herein are catered to the medical industry, the KOL system 150 is compatible or scalable to various industries such that the KOL system 150 generates a score 304 for professionals 152 based on information 202, 204 that defines attributes 214 pertinent to a particular industry. For instance, instead of the publication information 204 being medical journals for the medical industry, the publication information 204 may be legal articles (e.g., law review articles) for the legal industry or research papers for the researchers/professionals in a particular field of academic research (e.g., electrical engineering or psychology). In other examples, rather than the template of candidate attributes 214 being curated by an administrator of the KOL system 150, the template of candidate attributes 214 may be developed according to learning algorithms (e.g., clustering algorithms) that identify patterns within the information 202, 204 and form attributes 214 as containers to label similar or related information 202, 204. In other scenarios, the compiler 200, when compiling the information 202, 204, may categorize or classify the information 202, 204 into the candidate attributes 214 to enable compiler 200 (e.g., at the modeler 220) to build the professional profile 152.

As the KOL system 150 compiles a professional profile 212, the compiler 200 may experience some difficulty classifying information 202, 204 into attributes 214 corresponding to a professional profile 212. To illustrate, when the compiler 200 combs through data sources, the compiler 200 will encounter information 202, 204 that is a variant of other information. Because these variations are inevitable, the modeler 220 may be configured to account for these variations. Here, the modeler 220 may recognize whether an attribute 214 derived from information 202, 204 is a new attribute 214 that should be added to the profile 212 or an existing attribute 214 that should be (i) disregarded as duplicative or (ii) updated. Here, an existing or preexisting attribute 214 is an attribute 214 that the compiler 220 has already defined in a particular professional profile 212. For instance, the compiler 200 may run periodically or at a particular frequency to identify information 202, 204 about professionals 152 that may be added to one or more professional profile 212 (e.g., new journals articles are released). In some examples, the modeler 220 is configured to determine whether one attribute 214 (e.g., a newly identified attribute 214) corresponds to a preexisting attribute 214 of a professional profile 212 of one of the plurality of professionals 152 based on the at least one of the professional information 202 or the publication information 204 corresponding to the derived respective attribute 214. When the attribute 214 corresponds to the preexisting attribute 214 of the professional profile 212 of a professional 152, the modeler 220 may update the corresponding professional profile 212 to additionally include the respective attribute 214. To illustrate, a professional profile 212 already includes an existing training-based attribute 214 (e.g., that the professional 152 performed a post-doctoral training at University A), but the scraper 210 identifies another training-based attribute 214 during its recent information gathering operation. Here, the modeler 220 may identify whether the attributes 214 are (i) the same (i.e., duplicative) and should be disregarded or (ii) different (e.g., a second post-doctoral training at University B) and should be included in the professional profile 212 as another training-based attribute 214 or as additional detail for the existing training-based attribute 214.

In another example of variation, a professional profile 212 for a professional 152 includes a training-based attribute 214 that the professional 152 performed a post-doctoral training at the University of California—Los Angeles. Yet the scraper 210 may subsequently identify information 202, 204 about the professional 152 that forms a training-based attribute 214 which identifies that the professional 152 performed post-doctoral training at UCLA or, perhaps even more generally, post-doctoral training through the University of California system. Although a person familiar with these schools would understand that the University of California—Los Angeles is the same as UCLA, which is in the University of California system, the KOL system 150 cannot necessarily make this distinction naturally without further programming or rely on human intervention to confirm that these variations are indeed the same. Therefore, the KOL system 150 may be configured to use other context clues from the information 202, 204 to identify whether one attribute 214 (e.g., a post-doc at UCLA) matches another attribute 214 (e.g., an existing attribute 214 in a profile 212 of a post-doc at the University of California—Los Angeles).

In some implementations, an attribute 214 of a professional profile 212 is the name of the professional 152 for the professional profile 212. As one may expect, names may be particularly susceptible to variation. To compound the issue of variation, names may also have similarity. For example, there are many common surnames (i.e., last names) or common first names such that there may be multiple professionals 152 with the same name or only slightly different names (e.g., a different middle name). Culturally speaking, common surnames include Smith, Wang, Devi, Khan, Kim, Mohammed, Anderson, Garcia, Hernandez, Martinez, Lopez, Gonzalez, etc. Due to these issues with names, the compiler 200 may have some difficulty associating the attributes 214 with the correct professional 152. For example, the scraper 210 may gather professional information 202 and publication information 204 from the online database 138 for the professional 152, "John Smith." The scraper 210 may find professional information 202 and publication information 204 for "John Smith" and "John A. Smith." The scraper 210 places the professional information 202 and publication information 204 into attributes 214. Here, the compiler 200 has to determine whether the "John Smith" is the same professional 152 as "John A. Smith" or whether "John Smith" refers to a different professional 152 than "John A. Smith." In other words, the compiler 200 determines whether "John A. Smith" is a proper alias for "John Smith." Since the scraper 210 places the professional information 202 and the publication information 204 into attributes 214, the modeler 220 is configured to determine whether the attribute 214 for "John A. Smith" corresponds to an attribute 214 for "John Smith" (e.g., a preexisting attribute 214 for "John Smith").

In some examples, to determine whether the attribute 214 for "John A. Smith" corresponds to an attribute 214 for "John Smith" (e.g., a preexisting attribute 214 for "John Smith"), the modeler 220 determines whether professional information 202 and/or publication information 204 associated with the alias, "John A. Smith" matches an attribute 214 of the corresponding professional profile 212 for "John Smith." That is, the professional John Smith may have a professional profile 212 with attributes 214 of a Neurosurgeon who attended Yale University. The modeler 220 may receive an attribute 214 for an alias "John A. Smith" for a publication on "Modern Practices for Neurosurgeons." The modeler 220 determines whether the publication for the alias "John A. Smith" matches the professional "John Smith." In this example, the modeler 220 uses the publication information 204, such as the keyword Neurosurgeons in the title of the publication or that the publication includes authors who are professionals 152 known to work with "John Smith" to identify that there features of the publication information 204 match the attribute 214 that John Smith is a Neurosurgeon. Based on this match, the modeler 220 adds the attribute(s) 214 related to the publication to the professional profile 212 of John Smith.

When the compiler 200 identifies an alias for a professional 152, the modeler 220 may use an alias matching model to determine whether the corresponding professional information 202 associated with the alias matches an attribute 214 of the professional profile 212 for the professional 152. The alias matching model is configured to receive, as input, the professional information 202 for the alias of the professional 152 and professional attributes 214 of the professional profile 212 for the professional 152. Based on these inputs, the alias matching model generates, as output, a matching score that indicates a likelihood that the alias is an alias of the respective professional 152. In some configurations, the modeler 220 determines whether the matching score satisfies a matching score threshold to decide whether the alias is an alias of the respective professional 152. Here, the matching score threshold refers to a value that represents a level of confidence that the alias is an alias of the respective professional 152. When the alias matching model satisfies the threshold, the modeler 220 adds the publication attribute 214 to the professional profile 212 of the professional 152. For instance, the alias matching model determines that the alias "John A. Smith" satisfies the threshold and adds the publication attribute 214 to the professional profile 212 of "John Smith." In some implementations, when the alias matching model does not satisfy the threshold, the modeler 220 adds the publication attribute 214 to a new professional profile 212 for professional 152 "John A. Smith."

In some instances, the compiler 200 uses one or more machine learning models to perform decisions related to attributes 214 identified by the scraper 210. For example, the alias matching model is a machine learning model that has been trained to predict the matching score. The alias matching model may be trained on training examples that include an alias, professional information 202 for the alias, and attributes 214 in order to generate a prediction that corresponds to the matching score. Here, the training examples may be labeled whether each example is an alias for a professional 152 with the attributes 214 of the example (i.e., a positive example) or is not an alias for the professional 152 with the attributes 214 (i.e., a negative example). After training with these training examples, the modeler 220 uses the trained alias matching model to generate the matching score when the compiler 200 is generating one or more professional profiles 212.

The compiler 200 may also include a machine learning model associated with the scraper 210 to predict the attribute 214 that the professional information 202 and/or publication information 204 associates with. In some examples, the machine learning model for attributes 214 is an unsupervised model that learns associations relevant to the data provided to the model (e.g., information 202, 204). With this being the case, the scraper 210 may gather data from data sources (e.g., words or descriptors associated with a professional 152) that the unsupervised model learns to cluster into associated groups that form or define an attribute 214 of a professional profile 212. Additionally or alternatively, the machine learning model associated with scraper 210 may use Levenshtein distance to derive associations from the information 202, 204 to form attributes 214.

In some implementations, the modeler 220 generates attribute connections 215 between each professional 152 in the plurality of professionals 152. That is, where one or more professionals 152 have common attributes 214, the modeler 220 generates an attribute connection 215 for each common attribute 214. For example, when three professionals 152 publish a paper, all three professionals 152 are listed as authors for that paper. All three professionals 152 have the common attribute 214 related to the publication. The modeler 220 generates the attribute connection 215 between all three professionals 152 for the attribute 214 that relates to this particular publication. In another example, a first professional 152 publishes a paper that receives a mesh term of "Diabetes Mellitus" during the peer review process. The modeler 220 adds the mesh term "Diabetes Mellitus" to the publication attribute 214 or as its own mesh term attribute 214 of professional profile 212 for the professional 152. A second professional 152 publishes a separate paper from the first professional 152. The paper for the second professional also receives the mesh term "Diabetes Mellitus" during the peer review process. The modeler 220 generates the attribute connection 215 between the first and second professional 152 for the common attribute 214 of the mesh term "Diabetes Mellitus."

The modeler 220 generates the professional profile 212 for each professional 152 of the plurality of professionals 152. The professional profile 212 is based on the plurality of attributes 214 that the modeler 220 receives from the scraper 210. Each professional profile 212 includes the attributes 214 and the attribute connections 215 assigned to the respective professional 152 by the modeler 220. The modeler 220 transmits each professional profile 212 for the plurality of professionals 152, and the respective attributes 214 and attribute connections 215, to the scorer 300.

Figure 3:
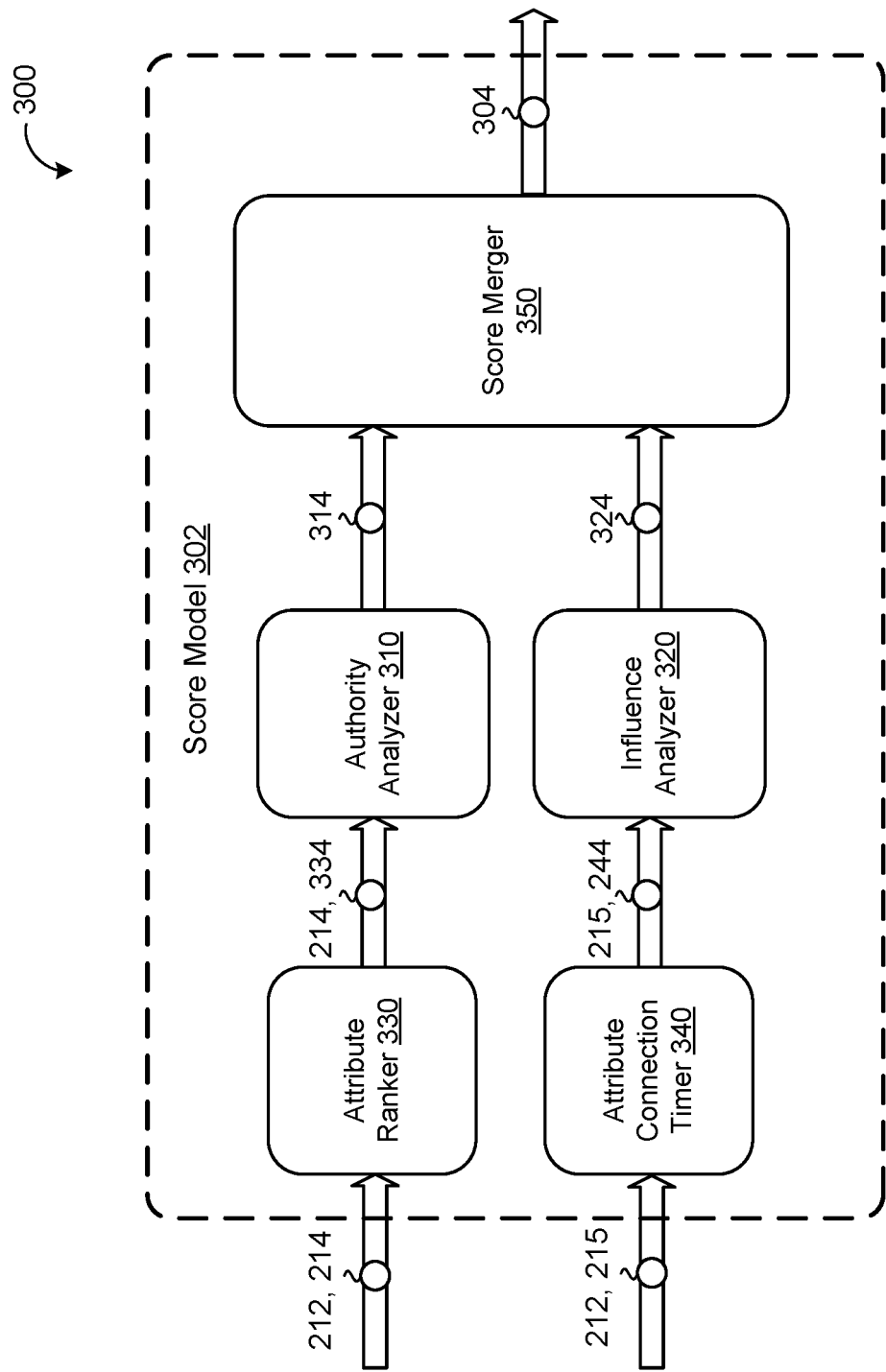
FIG. 3 is a schematic view of an exemplary scorer.

Referring now to FIG. 3, the scorer 300 includes the score model 302. The score model 302 may include an authority analyzer 310, an influence analyzer 320, an attribute ranker 330, an attribute connection timer 340, and a score merger 350. In some implementations, the score model 302 receives the professional profile 212 that includes the attributes 214 and attribute connections 215 for each professional 152. The authority analyzer 310 generates the authority component 314 of the score 304 based on attributes 214 of the plurality of attributes 214. The authority component 314 represents the credibility of a professional 152 and aims to quantify how authoritative the professional 152 is (e.g., in an industry, particular field, etc.). In some examples, the attributes 214 used to generate the authority component 314 of the score 304 include attributes 214 derived from professional information 202 relating to a professional 152. For example, pertinent attributes 214 to the authority component 314 of the score 304 may include a number publications, education, prior employment, and/or current employment.

To generate the authority component 314, the score model 302 utilizes the attribute ranker 330 to identify a rank associated with an attribute 214. For example, when generating the authority component 314 for a professional 152, the authority component 314 may be based, in part, on the fact that the professional 152 attended Johns Hopkins University. The attribute ranker 330 assigns a rank 334 for the education attribute 214 to John Hopkins University as the number two medical school in the country. The attribute ranker 330 transmits the respective attribute 214 and rank 334 associated with the respective attribute 214 to the authority analyzer 310. The authority analyzer 310 weighs the respective attribute 214 by the identified rank 334 associated with the respective attribute 214 to generate the authority component 314 of the score 304. From the above example, the authority analyzer 310 weighs the education attribute 214 by the rank 334 for Johns Hopkins University. Because Johns Hopkins is the number two ranked medical school, the authority analyzer 310 generates a high score for the authority component 314 for the professional 152. The authority analyzer 310 is not limited to weighing one attribute 214 to generate the authority component 314. In some examples, the authority analyzer 310 generates the authority component 314 based on multiple attributes 214 (e.g., publications and employment) where the authority component 314 is generated as an aggregate of each ranked attribute 214. The authority analyzer 310 may generate the authority component 314 on any number of attributes 214 received from the compiler 200. The authority analyzer 310 transmits the authority component 314 of the score 304 to the score merger 350.

By having an attribute ranker 330, the authority analyzer 310 ensures that the authority component 314 is a dynamic property that accounts for a current state of attributes 214 that impact the authority of a professional 152. For instance, in the current year, the professional 152 may be employed by the top medical school in the country. Since the professional 152 is currently employed with that top medical school, the current rank identified by the attribute ranker 330 reflects that it is the top medical school. Yet if the following year, the employer of the professional 152 drops in the rankings, the attribute ranker 330 would identify this lower ranking and relay this information to the authority analyzer 310 such that the weighted current employer attribute 214 would likely result in a lower authority component 314 (if other factors stayed constant). To further this example, there may be particular attributes 214 that do not change in rank because the attribute 214 occurred at a particular time in the past and therefore the rank is static to that particular time. For instance, the professional 152 attended the University of Michigan medical school when the University of Michigan medical school was ranked as the $8^{th}$ best medical school. Here, even though the University of Michigan medical school is currently ranked $15^{th}$, this was not the ranking when the professional 152 established this attribute 214 (e.g., educational attribute 214); therefore, the attribute ranker 330 is configured to identify the rank of the attribute 214 at the time of its relevance to the professional 152. In this approach, the attributes 214 that are current will be updated with current ranks while attributes 214 that were established in the past carry their rank at the time the attribute 214 occurred. By using this approach, the authority may rise or decline dynamically as the weight of current attributes 214 change.

The influence analyzer 320 is configured to generate the influence component 324 of the score 304. In some examples, the influence analyzer 320 generates the influence component 324 of the score 304 for each of the attribute connections 215 associated with a professional 152. The influence component 324 represents a quantification of the effect a professional 152 may have on other people (e.g., other people in a particular industry or particular profession) or the industry more generally. For instance, the influence component 324 represents the level of attribute connections 215 that a professional 152 has within a particular industry.

The influence component 324 may depend on the number of attribute connections 215 that a professional 152 has and/or the strength of those attribute connections 215. As a simple example, the number of attribute connections 215 for the attribute 214 of attending Harvard University may include the number of other professionals 152 that also attended Harvard University while the strength of the attribute connection 215 may be based on the duration and/or overlap of attribute connection 215.

In some implementations, the attribute connection timer 340 identifies a duration of the respective attribute connection 215 for the respective professional 152. For example, the professional 152 may have an attribute connection 215 with another professional 152 that attended Harvard University. The attribute connection timer 340 identifies the duration or overlap of the attribute connection 215. That is, for a professional 152 that attended Harvard University from 1980-1984, the duration would be four years from 1980-1984.

The attribute connection timer 340 generates an influence weight 344 for an attribute connection 215 of the professional 152 based on the identified duration of the attribute connection 215. The influence weight 244 indicates a correlation between the duration of the respective attribute connection 215 and the respective attribute connection 215. For example, for the professional 152 that attended Harvard University from 1980-1984 and the another professional 152 attended Harvard University from 1994-1998, there is an attribute connection 215 for attending Harvard University, but the influence weight 344 indicates that the attribute connection 215 has a relatively low strength. In this example, the influence weight 344 indicates a low strength of attribute connection 215 because, while both professionals 152 attended Harvard University, the professionals 152 had no overlapping duration of attending Harvard University. Stated differently, the fact that both professionals 152 are Harvard alumni may mean that one professional 152 has a small amount of influence over the other professional 152 based on this shared attribute 214, but this is determined to be only a small amount of influence because the ten year gap indicates that one professional 152 would be unlikely to easily affect the decision making of the other professional 152.

To contrast the above example, one professional 152 attended Harvard from 1986-1990 while another professional 152 attended Harvard University from 1987-1991. In this example, there is an attribute connection 214 for attending Harvard University and the influence weight 344 indicates a high strength of the attribute connection 215. The attribute details forming the connection indicate that both professionals 152 attended Harvard University with some degree of overlapping duration (e.g., three years) meaning both professionals 152 attended Harvard University at the same time. The attribute connection timer 340 identifies this duration or overlap of the attribute connection 215 between the two professionals 152 and generates the influence weight 344 that indicates a high strength of the attribute connection 215. Here, the influence weight 344 is high because the professionals 152 are more likely to have influence of one another when they attended Harvard University during the same time period. The attribute connection timer 340 transmits the attribute connection 215 and influence weight 344 associated with the attribute connection 215 to the influence analyzer 320.

The influence analyzer 320 generates the influence component 316 of the score 304 by aggregating each influence weight 344 associated with the one or more attribute connections 215. For example, the influence analyzer 320 may receive the influence weight 344 for the education attribute connection 215 along with the attribute connections 215 for publications, prior employment, and/or current employment. The influence analyzer 320 aggregates the influence weight 344 for each attribute connection 215 to generate the influence component 316. The influence analyzer 320 transmits the influence component 324 to the score merger 350.

In some implementations, the influence analyzer 320 generates the influence component 316 of the score 304 for each attribute connection 215 for a professional 152 based on a time period associated with an attribute connection 215 for the professional 152 identified by the attribute connection timer 340. The influence analyzer 320 generates an influence weight for the attribute connection 215 for the professional 152 based on a difference between a current time and the time period associated with the respective attribute connection 215 for the professional 152. The influence weight indicates a correlation between when the respective attribute connection 215 occurred and the current time when generating the score 304 that includes the influence component 316. In other words, the influence weight may be time dependent such that, as an attribute connection 215 occurred further and further in the past according to the attribute connection timer 340, the influence weight decays or becomes discounted to reflect a likely fading connection. In this sense, the influence component 316 of the score 304 factors in not only that an attribute connection 215 exists, but also some representation of whether the timing of the attribute connection 215 impacts the strength of the attribute connection 215. This is in contrast to systems that analyze social network connections, but fail to account for the fact that the dimension of time will ultimately impact network connections. For instance, without factoring in time, an approach which quantifies influence will inevitably weigh an old connection to have similar influence to a new or current connection. This approach is therefore divorced from the reality that time affects connections. In some examples, the influence analyzer 320 generates the influence component 316 of the score 304 by aggregating each influence weight associated with the one or more attribute connections 215.

The score merger 350 receives the authority component 314 and the influence component 324 to generate the score 304. In some implementations, the score merger 350 generates the score 304 as a sum of the authority component 314 and the influence component 324. That is, the score merger 350 adds the authority component 314 to the influence component 324 to produce the score 304. Once the score merger 350 generates the score 304, the score merger 350 is configured to transmit the score 304 to the computing environment 140.

Figure 4A:
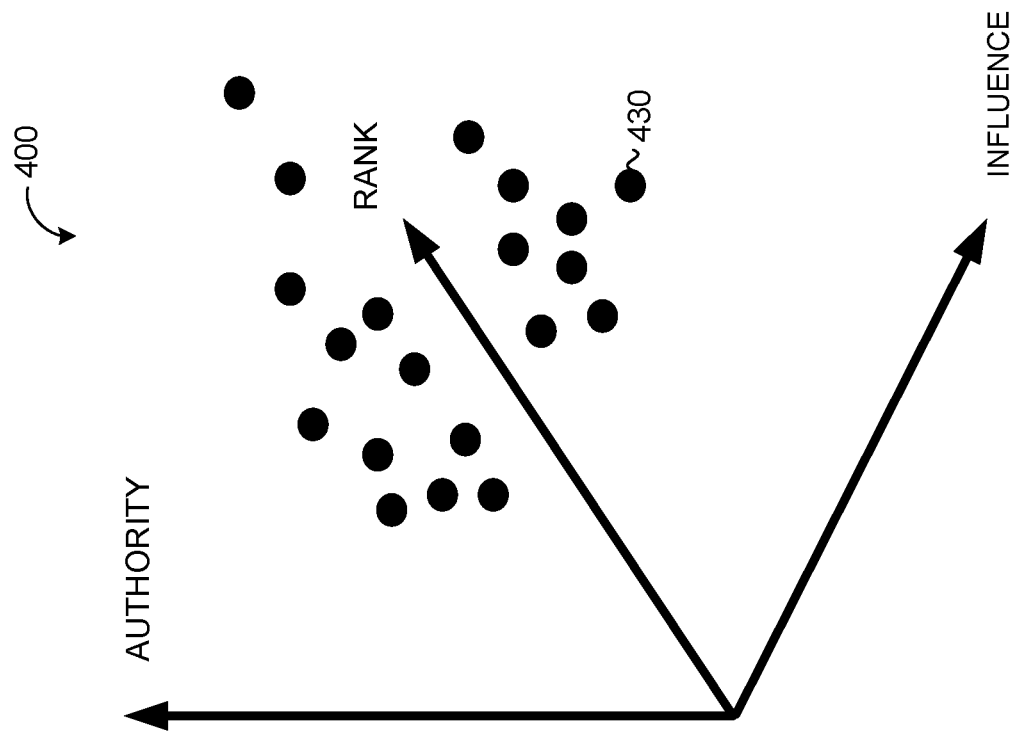
FIGS. 4A and 4B are exemplary arrangements of a dashboard interface.
Figure 4A:
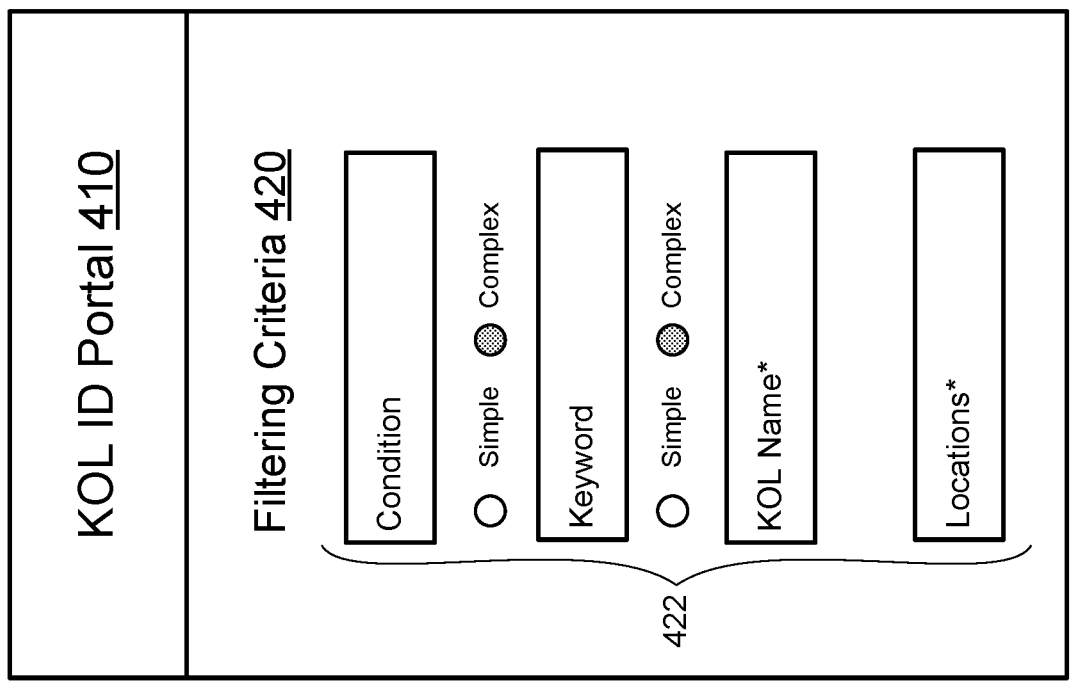

Referring now to FIG. 4A, the dashboard interface 400 may include a KOL identification portal 410, referred to as "portal 410" herein. The portal 410 is configured to allow the user 10 to perform a granular selection of professionals 152. The user 10 may select a professional 152 from among the plurality of professionals 152 using the portal 410 based on filtering criteria 420. In some implementations, the portal 410 receives a user input indicating the filtering criteria 420. The filter criteria 420 may include one or more filter terms 422. For example, the filter terms 422 include a condition, a keyword, a KOL name, and/or a location. That is, the user 10 may filter for professionals 152 based on location (e.g., San Diego). For each professional profile 212, the computing environment 140 generates a relevancy score based on the filter term 422 received from user input. The computing environment 140 weighs the score 304 from the scoring model 302 by the relevancy score to form an overall score 404 based on the filter term 422. The relevancy score, based on user input, allows the user 10 to generate the overall score 404 for the plurality of professionals 152 that represents specific needs of the user 10. For example, the user 10 is looking for a cardiovascular surgeon and enters the phrase "cardiovascular surgeon" in the dashboard interface 400 as a filter term 422. Upon receiving this filter term 422, the computing environment 140 and/or the KOL system 150 generates a relevancy score for each professional profile 212 that represents how relevant that filter term 422 is to the attributes 214 of the professional 152 associated with a professional profile 212. In some examples, the user 10 enters a compound filter (e.g., the keywords of "cardiovascular surgeon" along with a location of Los Angeles). In this example, the computing environment 140 and/or the KOL system 150 may not need to generate a relevancy score for each professional profile 212 that represents how relevant that filter term 422 is to the attributes 214 of the professional 152 associated with a professional profile 212, but rather only generates a relevancy score for the profile 212 of each professional 152 in the Los Angeles area.

In the example where the user 10 filtered the professionals 152 based only on location (e.g., San Diego), the computing environment 140 generates a high relevancy score for a professional 152 living in the city of San Diego and generates a low relevancy score for a professional 152 living in New York. Where the high relevancy score indicates that the professional 152 meets the filter terms 422 and the low relevancy score indicates that the professional does not meet the filter terms 422. In this example, the professional 152 from New York may have a high authority component 314 and a high influence component 324, but because the user 10 filtered based on a location of San Diego, the professional 152 from New York receives the low relevancy score. The professional 152 from San Diego receives a high relevancy score because the professional meets the filter terms 422. In the case of location as the filter term 422, the relevancy score for a professional 152 may be proportional to a distance from the location identified by the filter term 422. For instance, a professional 152 from Phoenix would have a higher relevancy score than the professional 152 from New York, but a lower relevancy score than a professional 152 actually from San Diego. The computing environment 140 weighs the score 304 from the scoring model 302 with the relevancy score to generate the overall score 404 or rank.

In some examples, the relevancy score for the professionals 152 is based on as count of how many of the filter terms 422 the respective professional profile 212 includes. For example, a user 10 may enter filter terms 422 of "Heart Surgeon" for keyword and "East Coast" for location. A professional 152 may have a professional profile 212 that includes a plurality of attributes 214 that include "heart" and/or "surgeon" and located on the east coast. In this example, the relevancy score for the professional 152 would be high because the professional 152 meets two of the filter terms 422 entered by the user 10.

The computing environment 140 generates the overall score 404 based on the score 304 and relevancy score. In some implementations, the computing environment 140 may multiply the relevancy score with the product of the authority component 314 and influence component 324 to generate the overall score 404.

Based on the user input, the computing environment 140 may generate a graphical representation that displays on the dashboard interface 400. In some examples, the graphical representation includes a three dimensional plot where the three dimensions of the plot represent the authority component 314 influence component 324, and rank. Here, the rank indicates the overall score 404 based on the user input. The computing environment 140 plots a node 430, 430a-n from the plurality of nodes 430 that corresponds to the professional profile 212 for each respective professional 152. In some implementations, the user 10 may further refine the filtering criteria 420 after viewing the nodes 430 in the graphical representation. The user 10 may select each node 430 via the user device 110 to display information for the respective professional 152 and professional profile 212 corresponding to the respective node 430.

Figure 4B:
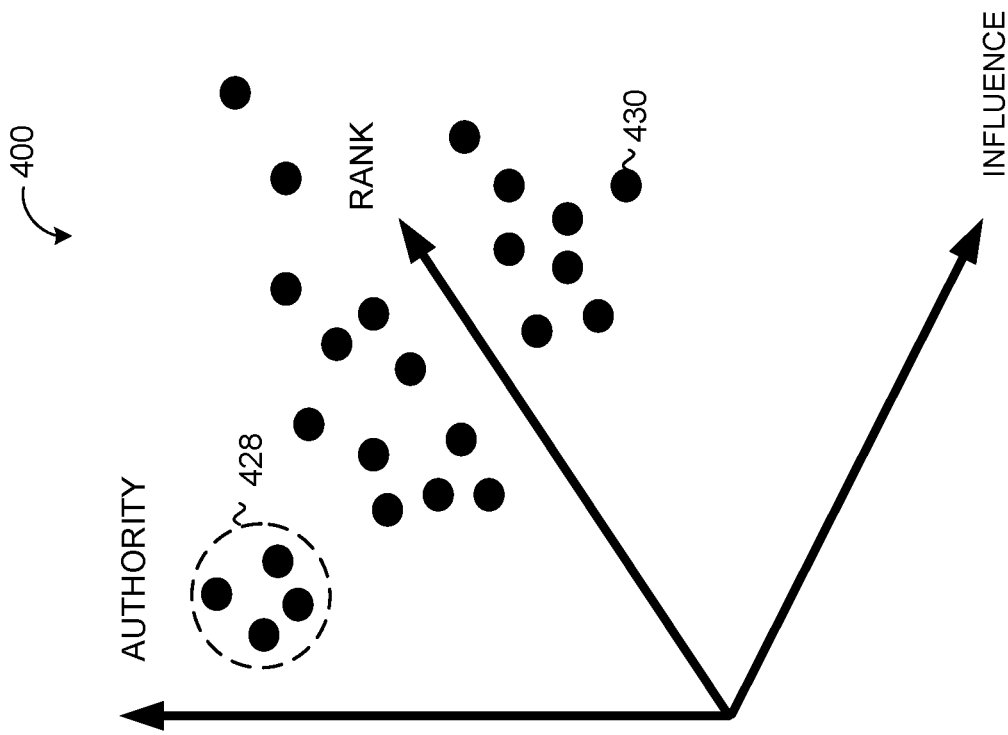
Figure 4B:
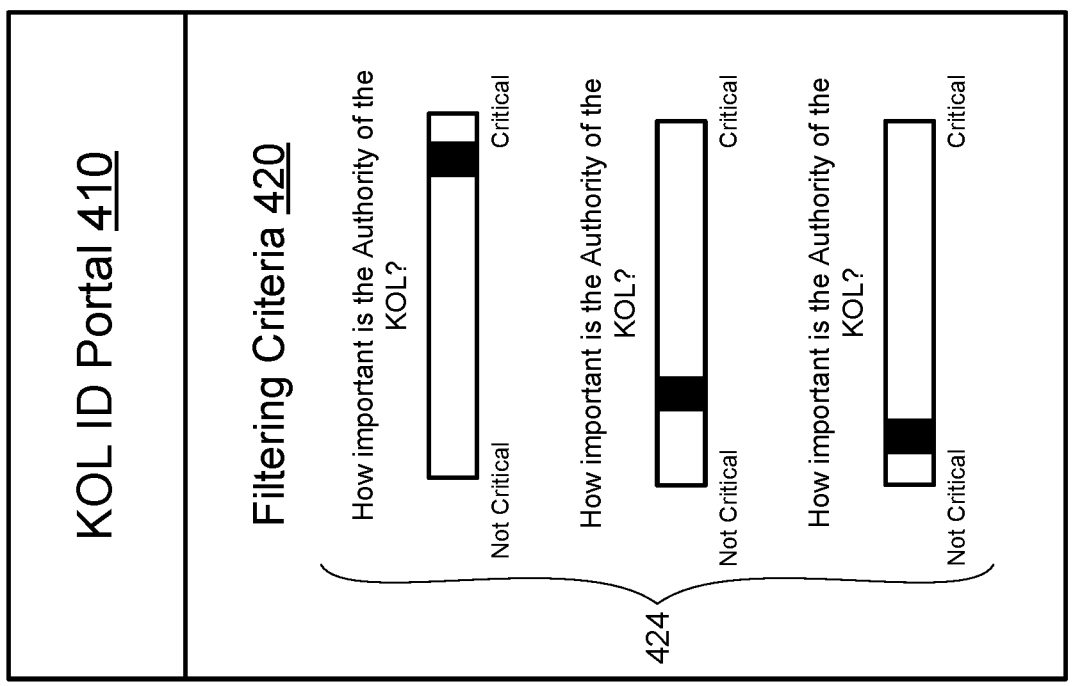

Referring now to FIG. 4B, in some examples, the filtering criteria 420 may include weighting criteria 424. Specifically, the portal 410 receives user input that indicates the amount of authority, influence, and/or rank selected by the user 10. The user 10 may utilize a sliding scale to indicate how critical/not critical each of the authority, the influence, and/or rank is to the user 10. As an example, the user 10 may indicate that authority is very critical, while neither the influence nor the rank is critical. In this example, the computing environment 140 generates a relevancy score for each professional 152 based on the identification criteria (e.g., sliding scale input). Here, the relevancy score heavily weighs the authority component 314 of the score 304 as the user 10 indicated in the portal 410. The computing environment 140 weighs the score 304 from the scoring model 302 by the relevancy score to form the overall score 404 based on the identification criteria. For the example, when the user 10 indicates that authority is critical while neither influence nor rank is critical, the computing environment 140 weighs heavily the authority component in the overall score 404. The computing environment 140 selects the one or more professionals 152 that satisfy the filter criteria. In this example, the computing environment 140 selects one or more professionals 152 with the highest overall sore 404. The one or more professionals 152 that the computing environment 140 selects may include a visual indicator 428 in the graphical representation around the respective nodes 430.

Figure 5:
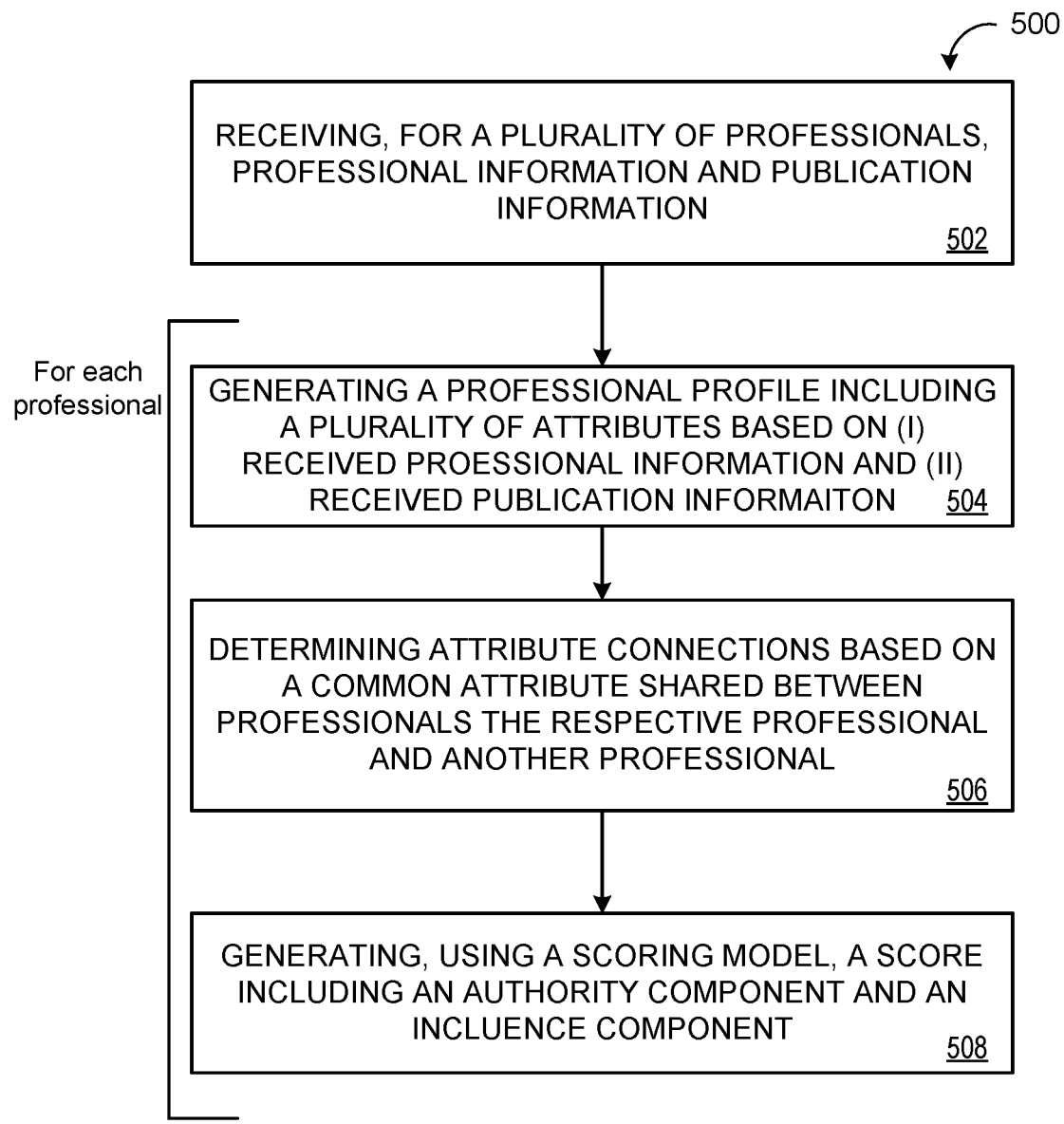
FIG. 5 is a flow chart of an example arrangement of operations for a method of operating an influencer scoring model.

FIG. 5 is flowchart of an exemplary arrangement of operations for a method 500 for an influencer scoring model. The method 500, at step 502, includes receiving, data processing hardware 112, for a plurality of professionals 152, professional information 202 and publication information 204. For each professional 152 of the plurality of professionals 152, the method 500, at step 504, includes generating, by the data processing hardware 112, a professional profile 212 that includes a plurality of attributes 214 related to the respective professional 152. The plurality of attributes 214 are based on (i) the received professional information 202 and (ii) the received publication information 204. The method 500, at step 506, includes determining, by the data processing hardware 112, one or more attribute connections 215 among the plurality of attributes 214 of the professional profile 212. Each attribute connection 215 is based on a common attribute 214 shared between the respective professional 152 and another professional 152 of the plurality of professionals 152.

The method 500, at step 508, includes generating, by the data processing hardware 112, using a scoring model 302, a score 304 that includes an authority component 314 and an influence component 324. The scoring model 302 is configured to receive, as inputs, the plurality of attributes 214 related to the respective professional 152 and the one or more attribute connections 215 for the respective professional 152. The authority component 314 represents a first portion of the score 304 determined based on at least one attribute 214 of the plurality of attributes 214 corresponding to the received professional information 202. The influence component 324 represents a second portion of the score 304 determined based on the one or more attribute connections 215 among the plurality of attributes 214 of the professional profile 212 of the respective professional 152.

Figure 6:
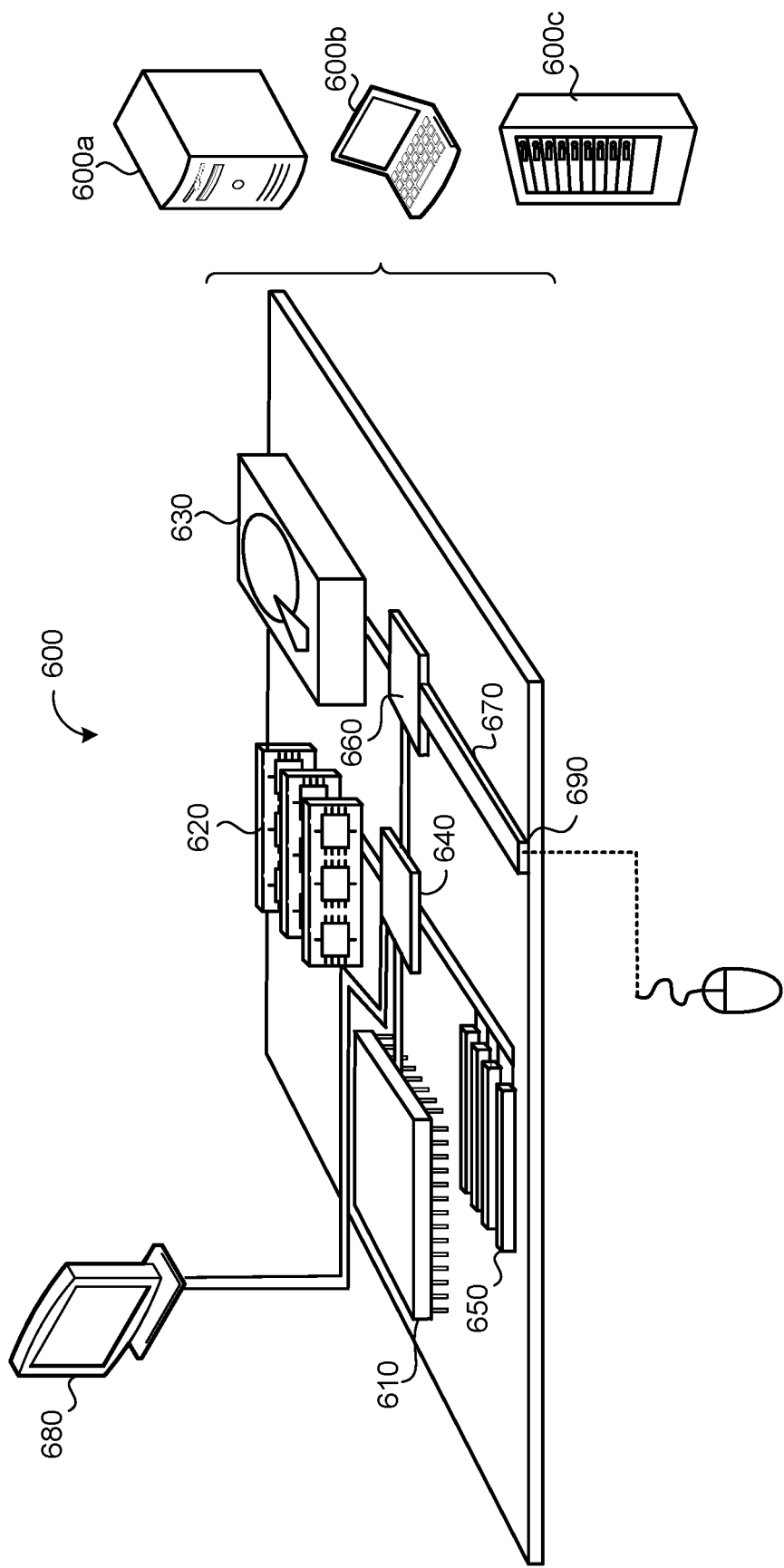
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (e.g., data processing hardware), memory 620 (e.g., memory hardware), a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, for a plurality of professionals, professional information and publication information; and
for each professional of the plurality of professionals:
generating, by the data processing hardware, a professional profile comprising a plurality of attributes related to the respective professional, the plurality of attributes derived from (i) the received professional information and (ii) the received publication information;
determining, by the data processing hardware, one or more attribute connections among the plurality of attributes of the professional profile, each attribute connection based on a common attribute shared between the respective professional and one or more other professionals of the plurality of professionals, wherein each attribute connection comprises a strength indicating a duration of the common attribute shared between the respective professional and the one or more other professionals of the plurality of professionals;
generating, by the data processing hardware, using a scoring model, a score comprising an authority component and an influence component, the scoring model configured to receive, as inputs, the plurality of attributes related to the respective professional and the one or more attribute connections for the respective professional, wherein the authority component representing a first portion of the score determined based on a rank of at least one attribute of the plurality of attributes corresponding to the received professional information of the respective professional, and wherein the influence component representing a second portion of the score determined based on the strength of the one or more attribute connections among the plurality of attributes of the professional profile of the respective professional;
receiving, at the data processing hardware, a user input indicating weighting criteria representing an amount of importance for each of the authority component and the influence component of the score;
generating, by the data processing hardware, a relevancy score based on the weighting criteria, the relevancy score comprising a first weight associated with the authority component and a second weight associated with the influence component; and
applying, by the data processing hardware, the first weight to the first portion of the score represented by the authority component and the second weight to the second portion of the score represented by the influence component to generate an overall score for the respective professional.

2. The method of claim 1, further comprising:
receiving, at the data processing hardware, a second user input indicating a filter term;
for each professional profile, updating, by the data processing hardware, the relevancy score based on the filter term received from the second user input; and
weighing, by the data processing hardware, the overall score by the updated relevancy score to generate an updated overall score based on the filter term received from the second user input.

3. The method of claim 1, wherein the professional information comprises at least one of a current employer, a past employer, a field of study, or an education degree.

4. The method of claim 1, wherein the publication information corresponds to at least one publication and comprises at least one of:
an author of the at least one publication;
a coauthor of the at least one publication;
an abstract of the at least one publication;
a title of the at least one publication; or
a mesh term associated with the at least one publication.

5. The method of claim 1, wherein the authority component of the score is generated by:
for each respective attribute of the at least one attribute of the plurality of attributes corresponding to the received professional information of the respective professional:
identifying the rank associated with the respective attribute; and
weighing the respective attribute by the identified rank associated with the respective attribute.

6. The method of claim 1, wherein the influence component of the score is generated by:
for each respective attribute connection of the one or more attribute connections for the respective professional:
identifying the duration of the respective attribute connection for the respective professional; and
generating a influence weight for the respective attribute connection of the respective professional based on the identified duration of the respective attribute connection, the influence weight indicating a correlation between the duration of the respective attribute connection and the respective attribute connection; and generating the influence component of the score by aggregating each influence weight associated with the one or more attribute connections.

7. The method of claim 6, further comprising:
identifying a time period associated with the respective attribute connection for the respective professional;
determining a time difference between the time period associated with the respective attribute connection for the respective professional and a current time; and
discounting the influence weight for the respective attribute connection for the respective professional based on the time difference between the time period associated with the respective attribute connection for the respective professional and a current time.

8. The method of claim 1, wherein the influence component of the score is generated by:
for each respective attribute connection of the one or more attribute connections for the respective professional:
identifying a time period associated with the respective attribute connection for the respective professional; and
generating a influence weight for the respective attribute connection for the respective professional based on a difference between a current time and the time period associated with the respective attribute connection for the respective professional, the influence weight indicating a correlation between when the respective attribute connection occurred and the current time when generating the score comprising the influence component; and
generating the influence component of the score by aggregating each influence weight associated with the one or more attribute connections.

9. The method of claim 1, wherein the overall score comprises a sum of the first weight applied to the first portion of the score represented by the authority component and the second weight applied to the second portion of the score represented by the influence component.

10. The method of claim 1, wherein generating the professional profile comprising the plurality of attributes related to the respective professional comprises:
deriving a respective attribute from at least one of the professional information or the publication information;
determining whether the respective attribute corresponds to a preexisting attribute of a corresponding professional profile of one of the plurality of professionals based on the at least one of the professional information or the publication information corresponding to the derived respective attribute; and
when the respective attribute corresponds to the preexisting attribute of the corresponding professional profile of one of the plurality of professionals, updating the corresponding professional profile to additionally comprise the respective attribute.

11. The method of claim 10, wherein the respective attribute comprises an alias of the respective professional of the corresponding professional profile, and wherein determining whether the respective attribute corresponds to the preexisting attribute of the corresponding professional profile comprises determining that the professional information associated with the alias matches the preexisting attribute of the corresponding professional profile for the respective professional.

12. The method of claim 11, wherein determining that the professional information associated with the alias matches the preexisting attribute of the corresponding professional profile for the respective professional comprises:
identifying at least one alias of the respective professional; and
determining, using an alias matching model, whether the corresponding professional information associated with the at least one alias matches one of the plurality of attributes of the corresponding professional profile for the respective professional, the alias matching model configured to receive, as input, the corresponding professional information for at least one alias of the respective professional and the plurality of attributes of the corresponding professional profile for the respective professional, and to generate, as output, a matching score indicating a likelihood that the at least one alias is an alias of the respective professional; and
determining that the matching score satisfies a matching score threshold indicating a level of confidence that the at least one alias is an alias of the respective professional.

13. A system comprising:
data processing hardware; and
memory hardware in communication with the data processing hardware, the memory hardware storing instructions that when executed on the data processing hardware cause the data processing hardware to perform operations comprising:
receiving, for a plurality of professionals, professional information and publication information; and
for each professional of the plurality of professionals:
generating a professional profile comprising a plurality of attributes related to the respective professional, the plurality of attributes derived from (i) the received professional information and (ii) the received publication information;
determining one or more attribute connections among the plurality of attributes of the professional profile, each attribute connection based on a common attribute shared between the respective professional and one or more other professionals of the plurality of professionals, wherein each attribute connection comprises a strength indicating a duration of the common attribute shared between the respective professional and the one or more other professionals of the plurality of professionals;
generating, using a scoring model, a score comprising an authority component and an influence component, the scoring model configured to receive, as inputs, the plurality of attributes related to the respective professional and the one or more attribute connections for the respective professional, wherein the authority component representing a first portion of the score determined based on a rank of at least one attribute of the plurality of attributes corresponding to the received professional information of the respective professional, and wherein the influence component representing a second portion of the score determined based on the strength of the one or more attribute connections among the plurality of attributes of the professional profile of the respective professional;

receiving a user input indicating weighting criteria representing an amount of importance for each of the authority component and the influence component of the score;

generating a relevancy score based on the weighting criteria, the relevancy score comprising a first weight associated with the authority component and a second weight associated with the influence component; and applying the first weight to the first portion of the score represented by the authority component and the second weight to the second portion of the score represented by the influence component to generate an overall score for the respective professional.

14. The system of claim 13, wherein the operations further comprise:

receiving a second user input indicating a filter term;

for each professional profile, updating the relevancy score based on the filter term received from the second user input; and weighing the overall score by the updated relevancy score to generate an updated overall score based on the filter term received from the second user input.

15. The system of claim 13, wherein the professional information comprises at least one of a current employer, a past employer, a field of study, or an education degree.

16. The system of claim 13, wherein the publication information corresponds to at least one publication and comprises at least one of:

an author of the at least one publication;

a coauthor of the at least one publication;

an abstract of the at least one publication;

a title of the at least one publication; or a mesh term associated with the at least one publication.

17. The system of claim 13, wherein the authority component of the score is generated by:

for each respective attribute of the at least one attribute of the plurality of attributes corresponding to the received professional information of the respective professional:

identifying the rank associated with the respective attribute; and weighing the respective attribute by the identified rank associated with the respective attribute.

18. The system of claim 13, wherein the influence component of the score is generated by:

for each respective attribute connection of the one or more attribute connections for the respective professional:

identifying the duration of the respective attribute connection for the respective professional; and generating a influence weight for the respective attribute connection of the respective professional based on the identified duration of the respective attribute connection, the influence weight indicating a correlation between the duration of the respective attribute connection and the respective attribute connection; and generating the influence component of the score by aggregating each influence weight associated with the one or more attribute connections.

19. The system of claim 18, wherein the operations further comprise:

identifying a time period associated with the respective attribute connection for the respective professional;

determining a time difference between the time period associated with the respective attribute connection for the respective professional and a current time; and discounting the influence weight for the respective attribute connection for the respective professional based on the time difference between the time period associated with the respective attribute connection for the respective professional and a current time.

20. The system of claim 13, wherein the influence component of the score is generated by:

for each respective attribute connection of the one or more attribute connections for the respective professional:

identifying a time period associated with the respective attribute connection for the respective professional; and generating a influence weight for the respective attribute connection for the respective professional based on a difference between a current time and the time period associated with the respective attribute connection for the respective professional, the influence weight indicating a correlation between when the respective attribute connection occurred and the current time when generating the score comprising the influence component; and generating the influence component of the score by aggregating each influence weight associated with the one or more attribute connections.

21. The system of claim 13, wherein the overall score comprises a sum of the first weight applied to the first portion of the score represented by the authority component and the second weight applied to the second portion of the score represented by the influence component.

22. The system of claim 13, wherein generating the professional profile comprising the plurality of attributes related to the respective professional comprises:

deriving a respective attribute from at least one of the professional information or the publication information;

determining whether the respective attribute corresponds to a preexisting attribute of a corresponding professional profile of one of the plurality of professionals based on the at least one of the professional information or the publication information corresponding to the derived respective attribute; and when the respective attribute corresponds to the preexisting attribute of the corresponding professional profile of one of the plurality of professionals, updating the corresponding professional profile to additionally comprise the respective attribute.

23. The system of claim 22, wherein the respective attribute comprises an alias of the respective professional of the corresponding professional profile, and wherein determining whether the respective attribute corresponds to the preexisting attribute of the corresponding professional profile comprises determining that the professional information associated with the alias matches the preexisting attribute of the corresponding professional profile for the respective professional.

24. The system of claim 23, wherein determining that the professional information associated with the alias matches the preexisting attribute of the corresponding professional profile for the respective professional comprises:

identifying at least one alias of the respective professional; and determining, using an alias matching model, whether the corresponding professional information associated with the at least one alias matches one of the plurality of attributes of the corresponding professional profile for the respective professional, the alias matching model configured to receive, as input, the corresponding professional information for at least one alias of the respective professional and the plurality of attributes of the corresponding professional profile for the respective professional, and to generate, as output, a matching score indicating a likelihood that the at least one alias is an alias of the respective professional; and determining that the matching score satisfies a matching score threshold indicating a level of confidence that the at least one alias is an alias of the respective professional.

* * * * *